United States Patent
Eccles et al.

(10) Patent No.: US 8,042,571 B2
(45) Date of Patent: Oct. 25, 2011

(54) RIGID MOUNT ANTI-LEAK FLUID COUPLER

(75) Inventors: Steven Robert Eccles, Torrance, CA (US); Frank Babayi, Irvine, CA (US); Filip Reinis, Long Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 679 days.

(21) Appl. No.: 12/175,410

(22) Filed: Jul. 17, 2008

(65) Prior Publication Data
US 2009/0229690 A1   Sep. 17, 2009

Related U.S. Application Data

(60) Provisional application No. 61/037,276, filed on Mar. 17, 2008.

(51) Int. Cl.
*F16L 37/34* (2006.01)
(52) U.S. Cl. .................. 137/614.03; 137/614.04
(58) Field of Classification Search . 137/614.03–614.06
See application file for complete search history.

(56) References Cited

U.S. PATENT DOCUMENTS

| | | | |
|---|---|---|---|
| 4,222,411 A | 9/1980 | Herzan et al. | |
| 4,240,466 A | 12/1980 | Herzan et al. | |
| 4,543,994 A | 10/1985 | Johnson et al. | |
| 4,664,148 A | 5/1987 | Magnuson | |
| 5,339,862 A | 8/1994 | Haunhorst | |
| 5,415,200 A * | 5/1995 | Haunhorst et al. | 137/614.03 |
| 5,603,353 A * | 2/1997 | Clark et al. | 137/614.05 |
| 5,967,491 A | 10/1999 | Magnuson et al. | |
| 6,029,701 A | 2/2000 | Chaffardon et al. | |
| 6,041,818 A * | 3/2000 | Schadewald et al. | 137/614.05 |
| 6,283,151 B1 | 9/2001 | Countryman et al. | |
| 6,675,833 B2 | 1/2004 | Maldavs | |
| 6,866,064 B2 * | 3/2005 | Nanni et al. | 137/614.03 |
| 7,237,760 B1 * | 7/2007 | Chiu | 137/614.03 |

OTHER PUBLICATIONS

European Search Report dated Jun. 8, 2010.

* cited by examiner

*Primary Examiner* — Kevin Lee
(74) *Attorney, Agent, or Firm* — Robert Desmond, Esq.

(57) ABSTRACT

A fluid coupler for connecting two hydraulic appliances together without requiring flexible hoses is described. The fluid coupler enables fluid-tight connecting between fixed position components and allows for separating the hydraulic appliances without decoupling the coupler while maintaining fluid-tightness of both appliances after separation.

14 Claims, 2 Drawing Sheets

RIGID MOUNT ANTI-LEAK FLUID COUPLER

BACKGROUND OF THE INVENTION

The present invention generally relates to apparatus for connecting equipment so that hydraulic and other fluids can be transferred between equipment and, more specifically, to apparatus for connecting equipment where fluids may be pressurized and where spillage and leakage are highly undesirable In many applications, flexible conduits such as hoses and tubing are inappropriate for connecting equipment, and equipment may be heavy and cumbersome to manipulate in order to align connectors needed to transfer hydraulic and other fluids. Connectors are needed to enable quick and reliable connections between such equipment.

Often the hydraulic fluid is under pressure and provides energy to perform some mechanical task. Connectors are needed that can be coupled and decoupled quickly and without requiring tools. Also, connectors must provide non-leaking connections. Furthermore, connectors are needed that automatically close when decoupled so that the fluid does not continue to flow out of the decoupled connector.

There are many examples of fluid connectors in the known art, most of which are intended for use with flexible conduit such as hose and tubing. Such connectors rely on a user to provide alignment by joining the hose coupler by hand. Many of them include spring operated internal valves to prevent fluid leakage when disconnected. They often include spring-loaded latching elements to enable "push-to-connect" functions. The spring-operated elements of such couplers can require significant force be overcome when attaching to the connecters. Furthermore, the latching elements can require manual release in order to decouple form the connector. This makes these connectors unsuitable for applications where heavy or fixed-position appliances need to be fluidly connected and where flexible conduit is not suitable.

One coupler in the prior art, U.S. Pat. No. 4,222,411 by Herzan, has a coupler body with two opposing coaxial female connectors for accepting two separate male connectors. The coupler body is substantially cylindrical with female connections aligned axially at either end of the cylinder. The particular coupler can accept one threaded male connector and one push-to-connect nipple.

The Herzan coupler has an inner plug that slides axially within the coupler body, the plug being movable via a cam-action rotary knob that extends radially from the cylinder body. The plug provides the female connection for the threaded male connector. In a closed position, a movable stopper within the coupler body seals off the opposite female connections from each other. In an open position, the rotary knob moves the inner plug with the threaded connection axially towards the opposite connection, in the process shifting the movable stopper to open a fluid path between the two female connections.

The Herzan coupler requires relative movement between the two attached connecters to effect coupling and decoupling, so it is not appropriate for fixed mounting to two hydraulic appliances. In addition, it also relies on spring-operated latches and valves to hold and seal the connectors.

Another connector from the prior art, U.S. Pat. No. 6,283,151 to Countryman et al, can be fixedly mounted to one appliance, yet requires the mating appliance be inserted into the coupler to form the connection. Like the aforementioned Herzan coupler, it has spring operated latches and internal valves.

As can be seen, there is a need for fluid connectors that can be fixedly mounted to hydraulic appliances and then coupled and decoupled without depending on flexible conduit and without requiring movement of either appliance in order to facilitate coupling and decoupling. Also, there exists a need for fluid connectors that can be employed without restoring forces that must be overcome in order to couple to the connector. Such restoring forces, usually the result of spring latches and spring operated internal valves, can be significant and make both mounting of fixed appliances and coupling to the fluid connector unnecessarily difficult.

SUMMARY OF THE INVENTION

In one aspect of the present invention, a fluid coupler comprises a main fluid housing being positionally fixed to and fluidly connected to a first hydraulic appliance; a main fluid passage circumscribed by the main fluid housing; a plug assembly being movable within the main fluid passage between a coupled position and a decoupled position; a remote fluid receiver positionally fixed to and fluidly connected to a second hydraulic appliance; the remote fluid receiver being engaged by the plug assembly in the coupled position; the plug assembly in the coupled position providing fluid communication between the main fluid housing and the remote fluid receiver; and the main fluid housing being wholly disengaged from the remote fluid receiver when the plug assembly is in the decoupled position.

In another aspect of the present invention, a fluid coupler comprises a main fluid housing, the main fluid housing having a main fluid inlet; the main fluid housing being positionally fixed to a first hydraulic appliance so that the main fluid inlet is in fluid communication with the first hydraulic appliance; a main fluid passage being circumscribed by the main fluid housing; a plug assembly being movable within the main fluid passage between a coupled position and a decoupled position; a remote fluid receiver, the remote fluid receiver having a receiver outlet; the remote fluid receiver being positionally fixed to a second hydraulic appliance so that the receiver outlet is in fluid communication with the second hydraulic appliance; the remote fluid receiver being engaged by the plug assembly in the coupled position; the plug assembly in the coupled position providing fluid communication between the main fluid housing and the remote fluid receiver; and the plug assembly, when moving between the coupled position and the decoupled position, moving with respect to the main fluid inlet and with respect to the receiver outlet.

In a further aspect of the present invention, a fluid coupler comprises a main fluid housing, the main fluid housing having a main fluid inlet; the main fluid housing being positionally fixed to a first hydraulic appliance so that the main fluid inlet is in fluid communication with the first appliance; a main fluid passage being circumscribed by the main fluid housing; a plug carrier sliding concentrically within the main fluid passage between a coupled position and a decoupled position; the plug carrier having a plug extension ring sliding concentrically and fluid-tightly within the plug carrier; the plug extension ring being biased outwards from the plug carrier and having an extension opening facing outwards from the plug carrier; a plug fixed to the plug carrier and sliding concentrically within the plug extension; the plug retracting the plug extension ring and sealing the extension opening when the plug carrier is in the decoupled position; the plug extending beyond the extension opening and unsealing the extension opening to expose the main fluid passage when the plug carrier is in the coupled position; a remote fluid receiver being engaged by the plug carrier in the coupled position; the remote fluid receiver being positionally fixed to a second hydraulic appliance; the remote fluid receiver being fluidly connected to the second hydraulic appliance; the plug carrier in the coupled position providing fluid communication between the main fluid housing and the remote fluid receiver; and the plug carrier in the decoupled position being wholly disengaged from the remote fluid receiver.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally relates to a fluid coupler for connecting two hydraulic appliances. The coupler may be useful when flexible conduit is unsatisfactory for establishing fluid connection between the appliances and where it is not practical to move the appliances with respect to each other in order to connect to the coupler. An example of an application for the invention is an aircraft-mounted fluid manifold connected to a pump mounted in a fixed position with respect to the manifold. In this application, flexible conduit is not available for use, and the weight and bulk of the pump make it difficult to manipulate the pump in order to connect to a conventional coupler with internal springs and restoring forces.

The fluid coupler of the present invention provides progress over the prior art in that the components of the coupler can be fixedly mounted to two hydraulic appliances, for example a pump and a fluid manifold, without overcoming internal restoring forces present in the coupler. After mounting the coupler, the coupler can be adjusted to establish fluid communication between the two appliances. Similarly, the coupler can be adjusted to terminate fluid communication, again without requiring movement of the either of the two appliances.

Figure 1:
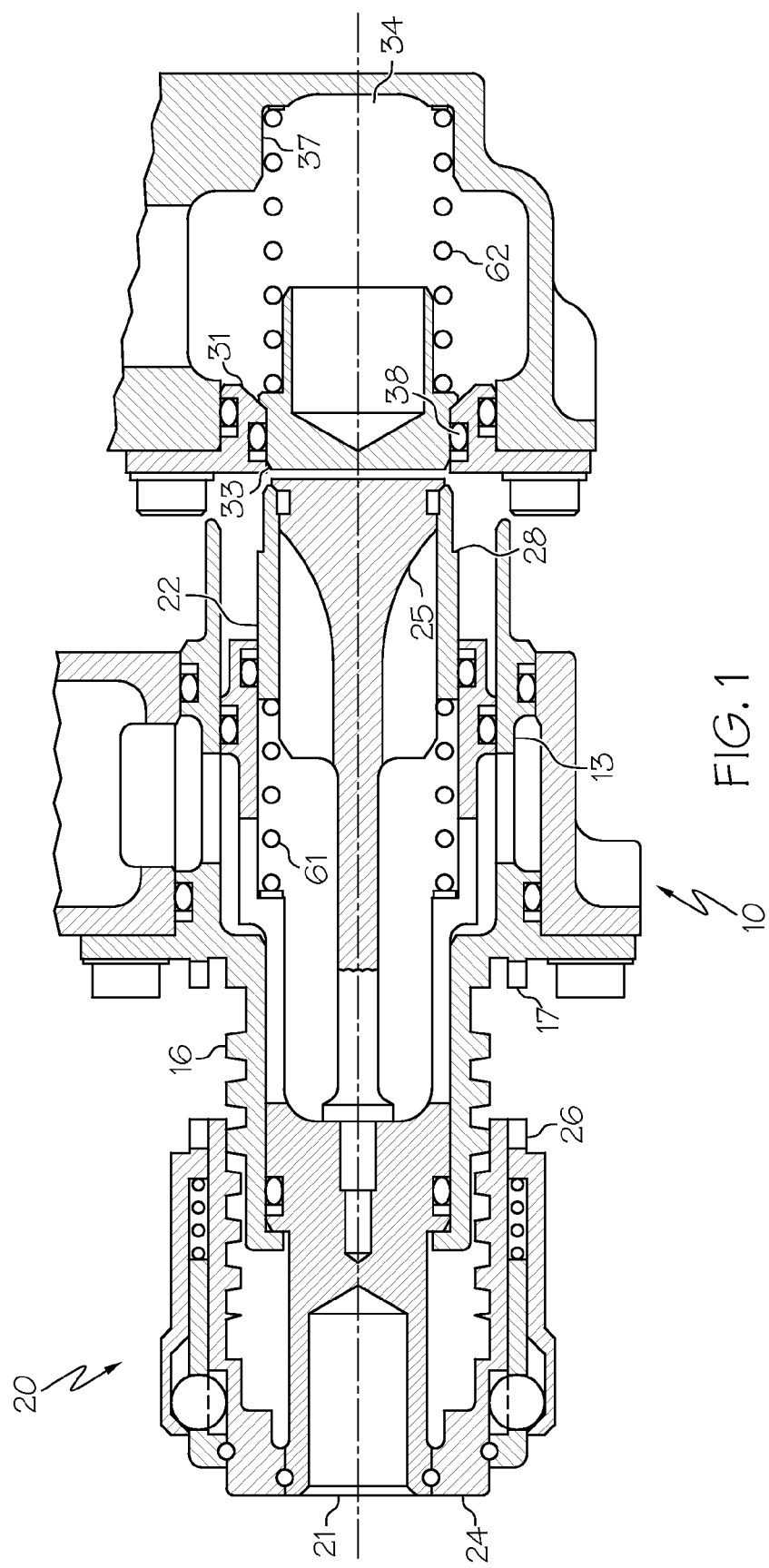
FIG. 1 is a sectional view of an embodiment of the invention in the decoupled position.
Figure 2:
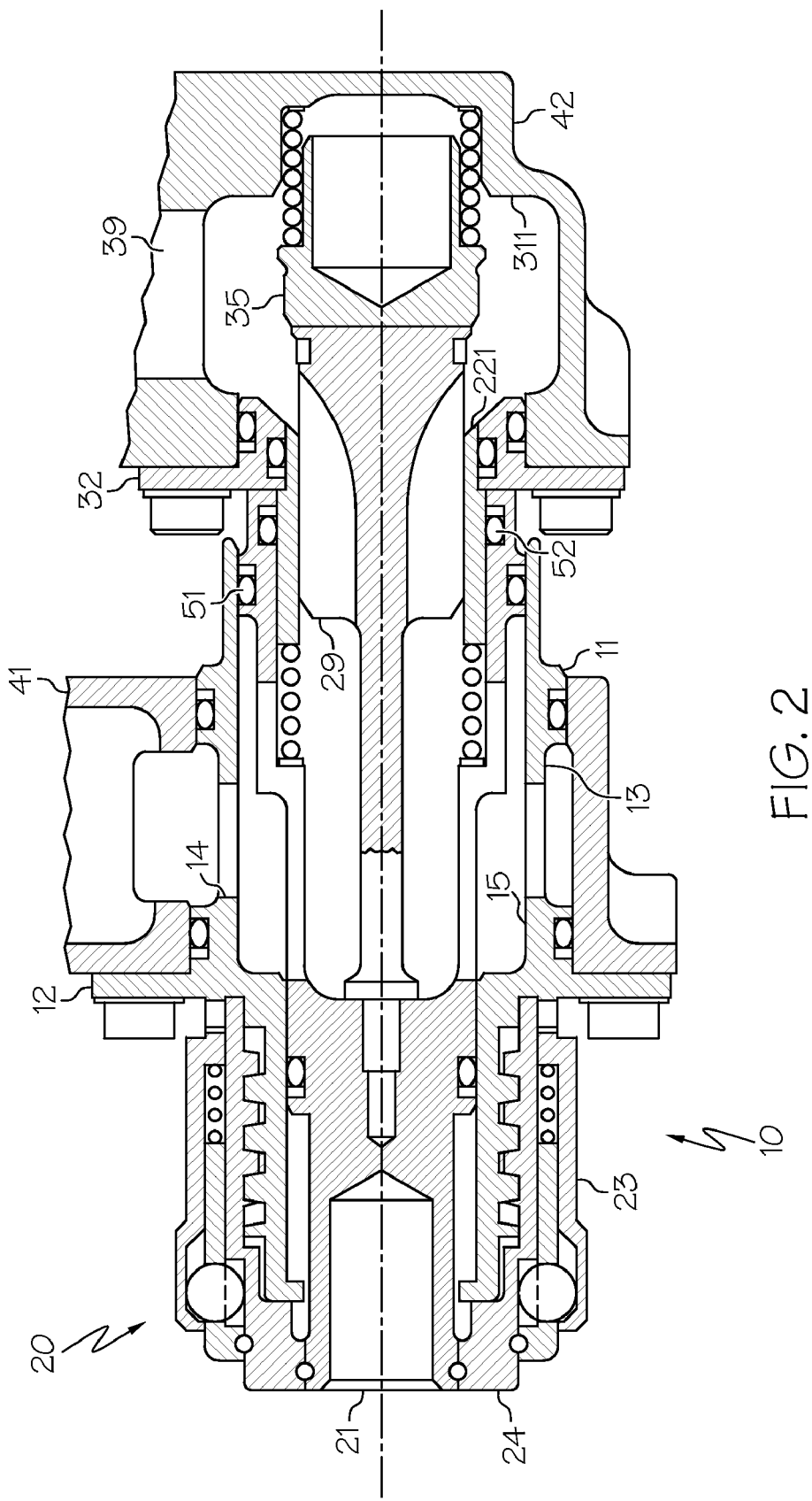
FIG. 2 is a sectional view of an embodiment of the invention in the coupled position.

Referring to FIGS. 1 and 2, which show an embodiment of the invention in a decoupled position and a coupled position, respectively, the fluid coupler 10 may have a main fluid housing 11 circumscribing a cylindrical main fluid passage 15. The main fluid housing may have at least one main fluid inlet 14 extending radially outwards from the main fluid passage 15. The main fluid housing 11 may be fixed to a first hydraulic appliance 41, with the main fluid housing 11 aligned so that the first hydraulic appliance 41 is in fluid communication with the main fluid inlet 14. The main fluid housing 11 may have a main annular channel 13 around the main fluid passage 15 with a plurality of main fluid inlets 14 connecting the annular channel 13 to the main fluid passage 15. As used here and throughout, "inlet" and "outlet" describe possible directions of fluid flow through fluid passages and do not limit the invention to specific flow directions. The main fluid housing 11 may be fixed to the first appliance 41 via a main mounting flange 12. The main fluid housing 11 may also include a threaded ring 16. The threaded ring 16 may be positioned coaxially with the main fluid passage 15.

The coupler 10 may have a plug assembly 20. The plug assembly 20 may move within the main fluid passage 15 and may move between a coupled position shown in FIG. 2 and a decoupled position shown in FIG. 1. The plug assembly 20 may include a plug carrier 21 sliding concentrically within the main fluid passage 15, and a plug extension ring 22 sliding concentrically and fluid-tightly within the plug carrier 21. The plug carrier 21 may be sealed to the main fluid passage 15 via an O-ring 51. The plug extension ring 22 may be sealed to the plug carrier 21 via an O-ring 52.

The plug assembly 20 may also include a plug 25 fixed to the plug assembly 20. The plug 25 may extend through the plug extension ring 22 and may be guided within the plug extension ring 22 by plug guides, for example the plug guide 29.

With the plug assembly 20 in the decoupled position, as shown in FIG. 1, the plug extension ring 22 may be biased against the plug 25 by an extension ring spring 61. An extension ring opening 221 may be sealed fluid-tightly by the plug 25, thereby preventing fluid flow from the first hydraulic appliance 41 through the main fluid passage 15 out of the extension ring opening 221.

The plug assembly 20 may also include a transition ring 24 connected to the plug carrier 21 and a locking adjuster 23 connected to the transition ring 24. The adjuster 23 may be spring-loaded to allow limited axial movement along the transition ring 24, but the adjuster 23 may be fixed to rotate with the transition ring 24. The transition ring may rotate about the plug carrier 21 but may be fixed axially to the plug carrier 21.

The transition ring 24 may be threaded to engage the threaded ring 16 and so move the plug assembly 20 axially by rotating the transition ring 24 to engage more thread and to engage less thread. As such, rotating the transition collar 24 may cause the plug assembly 20 to move between the coupled and decoupled position. As the plug assembly 20 approaches the coupled position, the adjuster 23 may contact the main fluid housing 11 and slide axially along the transition ring 24 until a locking tab 17 engages an adjuster notch 26.

The plug assembly 20 may slide along the main fluid passage 11 extending the plug extension ring 22 and the plug 25 outwards from the main fluid housing towards a remote fluid receiver 31. The remote fluid receiver 31 may have a receiver cavity 34 having a receiver outlet 39. The remote fluid receiver 31 may be positionally fixed to a second hydraulic appliance 42 with the remote fluid receiver 31 aligned so that the second fluid appliance 42 is in fluid communication with the receiver outlet 39. The remote fluid receiver 31 may have a receiver mounting flange 32 to facilitate mounting to the second hydraulic appliance 42. The remote fluid receiver 31 may also include a receiver opening 33 configured to accept the plug assembly 20. The remote fluid receiver may include a receiver annular channel 311 with a plurality of receiver outlets 39 connecting to the receiver cavity 34.

The remote fluid receiver 31 may have a poppet valve 35 biased to extend through the receiver opening 33 and to seal the receiver opening 33 to prevent fluid low from the second hydraulic appliance 42 through the receiver cavity 34. The poppet valve 35 may be biased by the valve spring 62 and the spring 62 may rest in the valve seat 37.

As the plug assembly 20 moves to the coupled position, the plug extension ring 22 may extend to enter the receiver opening 33. The plug 25 may abut the poppet valve 35 and push the poppet valve 35 into the receiver cavity 34 and away from the receiver opening 33. An extension ring shoulder 28 may abut the receiver opening 33 and seal against a receiver O-ring 38. As the plug carrier 21 moves further to the coupled position, the plug 25 may extend beyond the plug extension ring 22, unsealing from the plug extension ring 22 to enable fluid communication between the main fluid passage 15 and the remote fluid receiver cavity 34.

With the plug assembly 20 in the coupled position, fluid flow between the first hydraulic appliance 41 and the second hydraulic appliance 42 may be enabled via the main fluid passage 15 connecting with the receiver cavity 34.

The first hydraulic appliance 41 and the second hydraulic appliance 42 may be decoupled in two ways. In one case, the plug assembly 20 may be moved from the coupled position to the decoupled position. As the plug assembly 20 moves from the coupled position to the decoupled position, the plug 25 may retract to seal against the plug extension ring 22 and close off the main fluid passage 15 from the receiver cavity 34. As the plug assembly 20 moves further, the plug 25 may cause the plug extension ring 22 to retract and exit from the receiver opening 33. Also, while the plug 25 retracts, the poppet valve 35 may extend through the receiver opening 33 and seal the receiver opening 33, preventing fluid loss from the receiver cavity 34. When the plug assembly 20 returns to the decoupled position, the plug assembly 20 may be wholly disengaged from the remote fluid receiver 31 and the second appliance 42. The first hydraulic appliance 41 and the second hydraulic appliance 42 can each be removed for repairs and other maintenance without requiring further disconnection at the coupler 10.

Alternatively, the first hydraulic appliance 41 and the second hydraulic appliance 42 may be moved apart with the fluid coupler 10 in place and the plug assembly 20 in the coupled position. In this case, the plug extension ring 22 may extend further outwards from the main fluid housing 15 as the remote fluid receiver 31 moves away with the second hydraulic appliance 42. The plug extension ring 22 may maintain fluid-tight connection with the remote fluid receiver 31 as the plug extension ring 22 moves to abut the plug 25 and the plug 25 seals against the plug extension ring 22, closing off the main fluid passage 15 from the receiver cavity 34. As in the above-mentioned case, as the remote fluid receiver 31 moves away from the plug 25, the poppet valve 35 may extend through the receiver opening 33 and seal the receiver opening 33, preventing fluid loss from the second hydraulic appliance 42 through receiver cavity 34.

It should be noted that the plug assembly 20 may couple and decouple without moving either of the fluid inlets with respect to the appliances. The plug assembly 20 itself may move with respect to the main fluid inlet 14 and with respect to the receiver outlet 39, so there is no need for flexible conduit to connect to either appliance. This feature makes the fluid coupler 10 especially useful for certain applications where flexible conduit is inappropriate.

It should be understood, of course, that the foregoing relates to exemplary embodiments of the invention and that modifications may be made without departing from the spirit and scope of the invention as set forth in the following claims.

We claim:

1. A fluid coupler comprising:
    a main fluid housing being positionally fixed to and fluidly connected to a first hydraulic appliance;
    a main fluid passage circumscribed by the main fluid housing;
    a plug assembly comprising:
        a plug carrier configured to move within the main fluid passage;
        a transition ring rotatably connected to the plug carrier, the transition ring being threadably engaged to the main fluid housing;
        an adjuster connected to the transition ring, the adjuster being rotationally fixed to the ring,
        the adjuster configured to rotate the transition ring to engage more thread and to engage less thread and causing the plug carrier to move between the coupled position and the uncoupled position and
        the plug assembly being movable within the main fluid passage between a coupled position and a decoupled position;
    a remote fluid receiver positionally fixed to and fluidly connected to a second hydraulic appliance;
    the remote fluid receiver being engaged by the plug assembly in the coupled position;
    the plug assembly in the coupled position providing fluid communication between the main fluid housing and the remote fluid receiver; and
    the main fluid housing being wholly disengaged from the remote fluid receiver when the plug assembly is in the decoupled position.

2. The fluid coupler of claim 1 wherein the main fluid housing further comprises:
    a main fluid inlet extending into the main fluid passage; and
    the main fluid inlet extending radially in the main fluid passage.

3. The fluid coupler of claim 1 wherein the main fluid housing further comprises:
    an annular channel around the housing; and
    a plurality of main fluid inlets connecting the annular channel and the main fluid passage.

4. The fluid coupler of claim 1 wherein the remote fluid receiver further comprises:
    a receiver cavity; and
    a receiver outlet extending radially into the receiver cavity.

5. The fluid coupler of claim 1 wherein the remote fluid receiver further comprises:
    a receiver cavity;
    an annular channel around the remote fluid receiver; and
    a plurality of receiver outlets connecting the annular channel and the receiver cavity.

6. The fluid coupler of claim 1 wherein the plug assembly comprises:
    the plug carrier sliding concentrically within the main fluid passage;
    a plug extension ring sliding concentrically and fluid-tightly within the plug carrier;
    the plug extension ring extending outwards from the main fluid housing to engage the remote fluid receiver when the plug assembly is in the coupled position;
    the plug extension ring providing fluid communication between the main fluid passage and the remote fluid receiver.

7. The fluid coupler of claim 6 wherein the plug assembly further comprises:
    a plug fixed to the plug carrier and extending through the plug extension ring;

the plug sealing the plug extension ring fluid-tightly when the plug assembly is in the decoupled position;

the plug extending beyond the plug extension ring and unsealing from the plug extension ring to enable fluid communication between the main fluid passage and the remote fluid receiver when the plug assembly is in the coupled position.

8. A fluid coupler comprising:

a main fluid housing, the main fluid housing having a main fluid inlet;

the main fluid housing being positionally fixed to a first hydraulic appliance so that the main fluid inlet is in fluid communication with the first hydraulic appliance;

a main fluid passage being circumscribed by the main fluid housing;

a plug assembly being movable within the main fluid passage between a coupled position and a decoupled position;

a remote fluid receiver, the remote fluid receiver having a receiver outlet;

the remote fluid receiver being positionally fixed to a second hydraulic appliance so that the receiver outlet is in fluid communication with the second hydraulic appliance;

the remote fluid receiver being engaged by the plug assembly in the coupled position;

the plug assembly in the coupled position providing fluid communication between the main fluid housing and the remote fluid receiver; and the plug assembly, when moving between the coupled position and the decoupled position, moving with respect to the main fluid inlet and with respect to the receiver outlet, wherein the first and second hydraulic appliances remain in the same position relative to one another irrespective of whether the plug assembly is in the coupled position or the decoupled position.

9. The fluid coupler of claim 8 wherein the main fluid housing further comprises:

a threaded flange concentric to the main fluid passage; and wherein the plug assembly comprises:

a threaded adjuster connecting the plug assembly to the threaded flange; and the adjuster rotating to move the plug assembly between the coupled position and the decoupled position.

10. The fluid coupler of claim 8 wherein the main fluid inlet extends radially into the main fluid passage.

11. The fluid coupler of claim 8 wherein the main fluid housing further comprises:

an annular channel around the housing; and a plurality of main fluid inlets connecting the annular channel and the main fluid passage.

12. The fluid coupler of claim 8 wherein the plug assembly in the decoupled position is wholly disengaged from the remote fluid receiver.

13. The fluid coupler of claim 8 wherein the remote fluid receiver further comprises a receiver cavity, and wherein the receiver outlet extends radially into the receiver cavity.

14. The fluid coupler of claim 8 wherein the remote fluid receiver comprises:

a receiver cavity with a receiver opening;

the receiver cavity being fluidly connected to the receiver outlet;

a poppet valve being biased towards the receiver opening and sealing the receiver opening when the plug assembly is in the decoupled position; and the poppet valve being moved away from the receiver opening by the plug assembly and unsealing the opening when the plug assembly is in the coupled position.

* * * * *